(12) United States Patent
Subramanian et al.

(10) Patent No.: US 11,876,600 B2
(45) Date of Patent: Jan. 16, 2024

(54) METHOD AND SYSTEM FOR AUTOMATIC SWITCHING TO IP CONNECTION FROM SATELLITE CONNECTION BASED ON RAIN FADE EVENT PATTERNS

(71) Applicant: ARRIS Enterprises LLC, Suwanee, GA (US)

(72) Inventors: Kirubakaran Subramanian, Tamilnadu (IN); Mahesh Shankar Handigund, Karnataka (IN)

(73) Assignee: ARRIS Enterprises LLC, Suwanee, GA (US)

( * ) Notice: Subject to any disclaimer, the term of this patent is extended or adjusted under 35 U.S.C. 154(b) by 185 days.

(21) Appl. No.: 17/586,339

(22) Filed: Jan. 27, 2022

(65) Prior Publication Data

US 2022/0321208 A1    Oct. 6, 2022

Related U.S. Application Data

(60) Provisional application No. 63/170,808, filed on Apr. 5, 2021.

(51) Int. Cl.
*H04B 7/185*        (2006.01)
*H04B 17/382*      (2015.01)
(Continued)

(52) U.S. Cl.
CPC ........ *H04B 7/18532* (2013.01); *H04B 1/0078* (2013.01); *H04B 17/345* (2015.01); *H04B 17/382* (2015.01)

(58) Field of Classification Search
CPC ..... H04W 40/18; H04W 48/18; H04W 40/00; H04W 40/12; H04W 40/16; H04B 1/0078;
(Continued)

(56) References Cited

U.S. PATENT DOCUMENTS 6,724,737 B1 * 4/2004 Boyden .............. H04B 7/18517
                                                                    370/316
10,945,298 B1    3/2021 Hadadi et al.
(Continued)

FOREIGN PATENT DOCUMENTS

KR    10-1760818 B1    7/2017
WO   2021/016078 A1    1/2021

OTHER PUBLICATIONS

Al-tabatabaie et al., "Long-term Rain Attenuation Probablity and Site Diversity Gain Prediction", IEEE, 2007, 5 pages (Year: 2007).*
(Continued)

*Primary Examiner* — Quoc Thai N Vu
(74) *Attorney, Agent, or Firm* — Panitch Schwarze Belisario & Nadel LLC

(57) ABSTRACT

A method, a server, and a non-transitory computer readable medium are disclosed for switching from a radio frequency (RF) signal to an Internet Protocol (IP) connection based on rain fade events. The method includes receiving, on a server, current rain fade event data from one or more set-top boxes; receiving, on the server, past rain fade event data from the one or more set-top boxes; receiving, on the server, past weather data; receiving, on the server, current weather data; calculating, on the server, a likelihood of the one or more set-top boxes experiencing a rain fade event; and sending, from the server, an IP message to switch from the radio frequency (RF) signal to the Internet Protocol (IP) connection to each of the one or more set-top boxes likely to experience the rain fade event before the rain fade event occurs.

20 Claims, 6 Drawing Sheets

(51) Int. Cl.
*H04B 17/345* (2015.01)
*H04B 1/00* (2006.01)

(58) Field of Classification Search
CPC .... H04B 17/373; H04B 17/26; H04B 17/345; H04B 17/382; H04B 17/3913; H04B 7/18513; H04B 7/18517; H04B 7/18532; H04B 7/18534; H04L 41/16; H04L 45/22; H04L 45/00
See application file for complete search history.

(56) References Cited

U.S. PATENT DOCUMENTS

| | | |
|---|---|---|
| 2009/0047943 A1 | 2/2009 | Araki |
| 2018/0167312 A1 | 6/2018 | Liu et al. |
| 2021/0058293 A1* | 2/2021 | Whitefield ......... H04B 7/18534 |

OTHER PUBLICATIONS

Dahman et al. "Rain attenuation prediction model for satellite communications based on the Météo-France ensemble prediction system PEARP", Natural Hazards and Earth System Sciences, 2018, 15 pages. (Year: 2018).*

Malaquias, "10 Machine Learning Algorithms You Need to Know", https://www.linkedin.com/pulse/10-machine-learning-algorithms-you-need-know-jean-malaquias, (May 18, 2020), (10 pages).

Wikipedia, "Rain Fade", From Wikipedia, the free encyclopedia, Retrieved from "https://en.wikipedia.org/w/index.php?title=Rain_fade&oldid=1038495895" (Aug. 12, 2021), (3 pages).

Notification of Transmittal of the International Search Report (Forms PCT/ISA/220 and PCT/ISA/210) and the Written Opinion of the International Searching Authority (Form PCT/ISA/237) dated May 10, 2022, by the International Application Division Korean Intellectual Property Office in corresponding International Application No. PCT/US2022/013998. (9 pages).

* cited by examiner

METHOD AND SYSTEM FOR AUTOMATIC SWITCHING TO IP CONNECTION FROM SATELLITE CONNECTION BASED ON RAIN FADE EVENT PATTERNS

TECHNICAL FIELD

The present disclosure generally relates to a method and system for automatic switching to an Internet Protocol (IP) connection from a satellite connection based on rain fade event patterns, and more particularly to a method and system for automatic switching to an IP connection from a digital video broadcasting-satellite (DVB-S/S2) radio frequency (RF) connection based on rain fade event patterns using artificial intelligence and machine learning (AI/ML).

BACKGROUND

Rain fade can be the absorption of a radio frequency (RF) signal by atmospheric rain, snow, or ice, and/or the degradation of the radio frequency signal caused by electromagnetic interference of a leading edge of a storm front. Rain fade can also be caused by precipitation at the uplink or downlink location.

Customers often report rain fade issues when the RF signal received by a satellite set-top box is lost and the bit error rate (BER) levels change to a value where an error recovery algorithm in the satellite set-top box fails to recover correct data from the RF signal for decoding.

In view of the above, it would be desirable to have a system and method for automatically switching to an Internet Protocol (IP) connection on a satellite hybrid set-top boxes before the radio frequency (RF) signals from one or more communication satellites is lost due to rain fade.

SUMMARY

In accordance with an aspect, an artificial intelligence/machine learning (AI/ML) based solution is disclosed in which a cloud-based artificial intelligence/machine learning (AI/ML) engine is trained based on data from rain fade event patterns received from one or more hybrid set-top boxes and weather data, for example, from a weather information server. The data from the rain fade patterns of the hybrid set-top boxes and weather data can be used to train the AI/ML engine to help predict when the hybrid set-top boxes should be automatically switched to an IP connection before the rain fade occurs giving users an uninterrupted viewing experience. In accordance with an embodiment, for example, the automatic switching to the IP connection can be achieved by sending an IP message from the AI/ML engine to each of the individual hybrid set-top boxes in the given area with a message to switch to an IP connection.

In accordance with another aspect, in order to provide a viewing experience relatively free of interruption, weather information and rain fade issues are monitored in a given area from a group or plurality of hybrid set-top boxes (STB(s)). Rain fade events, weather data, and current weather data can be fed into an AI/ML engine configured to predict and inform the set-top boxes to switch to IP connection when the weather is likely to cause a rain fade event.

In accordance with a further aspect, based on previous rain fade events and current weather data, for example, received from the hybrid set-top boxes in a given area and with continuous monitoring of the current weather data, switching back to a RF connection can also be performed relatively seamlessly from the IP connection when appropriate based on the data received from the hybrid set-top boxes, the past and present rain fade events, and the current weather data indicates that it would be appropriate.

In accordance with an another aspect, a method is disclosed for switching from a radio frequency (RF) signal to an Internet Protocol (IP) connection based on rain fade events, the method comprising: receiving, on a server, current rain fade event data from one or more set-top boxes; receiving, on the server, past rain fade event data from the one or more set-top boxes; receiving, on the server, past weather data; receiving, on the server, current weather data; calculating, on the server, a likelihood of the one or more set-top boxes experiencing a rain fade event based on the current rain fade event data from the one or more set-top boxes, the past rain fade event data from the one or more set-top boxes, the past weather data, and the current weather data; and sending, from the server, an IP message to switch from the radio frequency (RF) signal to the Internet Protocol (IP) connection to each of the one or more set-top boxes likely to experience the rain fade event before the rain fade event occurs.

In accordance with a further aspect, a server is disclosed comprising: an operating system; and a processor configured to: receive current rain fade event data from one or more set-top boxes; receive past rain fade event data from the one or more set-top boxes; receive past weather data; receive current weather data; calculate a likelihood of the one or more set-top boxes experiencing a rain fade event based on the current rain fade event data from the one or more set-top boxes, the past rain fade event data from the one or more set-top boxes, the past weather data, and the current weather data; and send an IP message to switch from a radio frequency (RF) signal to an Internet Protocol (IP) connection to each of the one or more set-top boxes likely to experience the rain fade event before the rain fade event occurs.

In accordance with another aspect, a non-transitory computer readable medium is disclosed having instructions operable to cause one or more processors to perform operations for switching from a radio frequency (RF) signal to an Internet Protocol (IP) connection based on rain fade events comprising: receiving, on a server, current rain fade event data from one or more set-top boxes; receiving, on the server, past rain fade event data from the one or more set-top boxes; receiving, on the server, past weather data; receiving, on the server, current weather data; calculating, on the server, a likelihood of the one or more set-top boxes experiencing a rain fade event based on the current rain fade event data from the one or more set-top boxes, the past rain fade event data from the one or more set-top boxes, the past weather data, and the current weather data; and sending, from the server, an IP message to switch from the radio frequency (RF) signal to the Internet Protocol (IP) connection to each of the one or more set-top boxes likely to experience the rain fade event before the rain fade event occurs.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
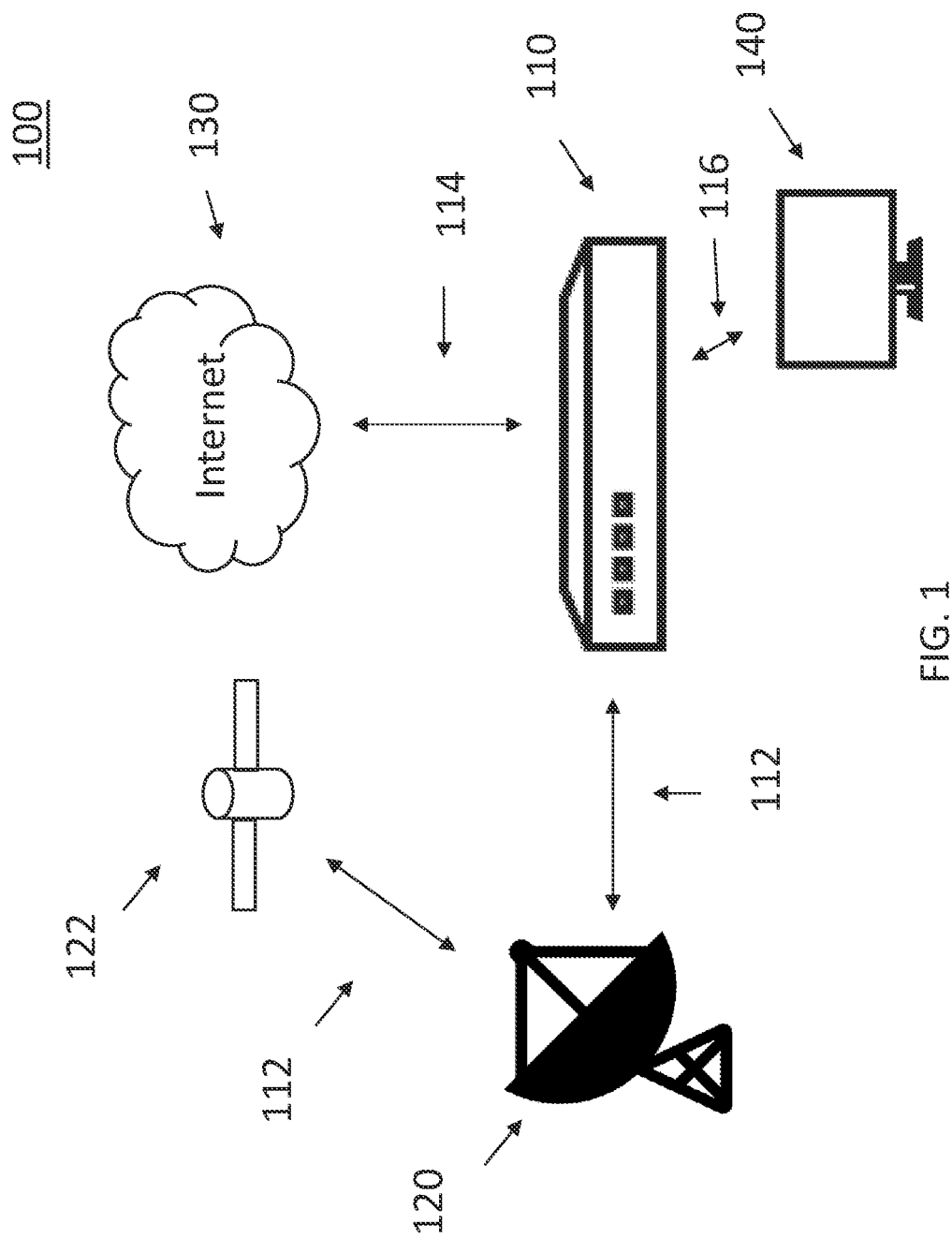
FIG. 1 is an illustration of an exemplary network environment for a system and method for automatic switching to an Internet Protocol (IP) connection from a satellite connection based on rain fade event patterns in accordance with an exemplary embodiment.

System for Automatic Switching to an Internet Protocol (IP) Connection from a Satellite Connection Based on Rain Fade Event Patterns FIG. 1 is an illustration of an exemplary network environment 100 for a system and method for automatic switching to an Internet Protocol (IP) connection from a satellite connection based on rain fade event patterns in accordance with an exemplary embodiment. As shown in FIG. 1, the system 100 can include a customer-premise equipment or customer-provided equipment (CPE), for example, a set-top box 110 and an outdoor parabolic antenna (or satellite dish) 120 configured to receive content from a communications satellite 122 orbiting the earth via a satellite connection, for example, a radio frequency (RF) signal 124. In accordance with an exemplary embodiment, the set-top box 110 can be a hybrid set-top box that supports video broadcasting, for example, received from the communications satellite 122, for example, a digital video broadcasting-satellite (DVB-S (Original Generation) or DVB-S2 (Second Generation)) and IP-based video, and which allows the users to view cable programming or content as well as videos or content from the Internet or local IP network 130.

In accordance with an exemplary embodiment, the set-top box 110, for example, the customer premise equipment (CPE) device, provides access a variety of multimedia services, including but not limited to live or linear television, digital video recorder (DVR) content, video-on-demand (VoD) content, over-the-top (OTT) content, and others. Alternatively, the set-top box 110 can receive Internet Protocol-based (IP-based) streaming content. In embodiments, various data, multimedia, and/or voice services may be delivered to the set-top box 110 including but not limited to, live or broadcast television, video on-demand (VoD) content, pay-per view content, recorded content (e.g., DVR content), audio-only content, streaming content, and others. The set-top box 110 can receive, for example, video and/or data services from the Internet 130 over a local network 114 (for example, a wireless local area network (WLAN) or a personal area network (PAN), etc.).

The set-top box 110 may process and output content to one or more media play devices 140 such as a television, mobile device, tablet, computer, and any other device operable to receive video, voice, and/or data services. In accordance with an exemplary embodiment, the set-top box 110 may communicate with the one or more media play devices 140, for example, a television, over a local network 116 (for example, a local area network (LAN), a wireless local area network (WLAN), a personal area network (PAN), etc.) and/or a wire, for example, an HDMI cable.

Figure 2:
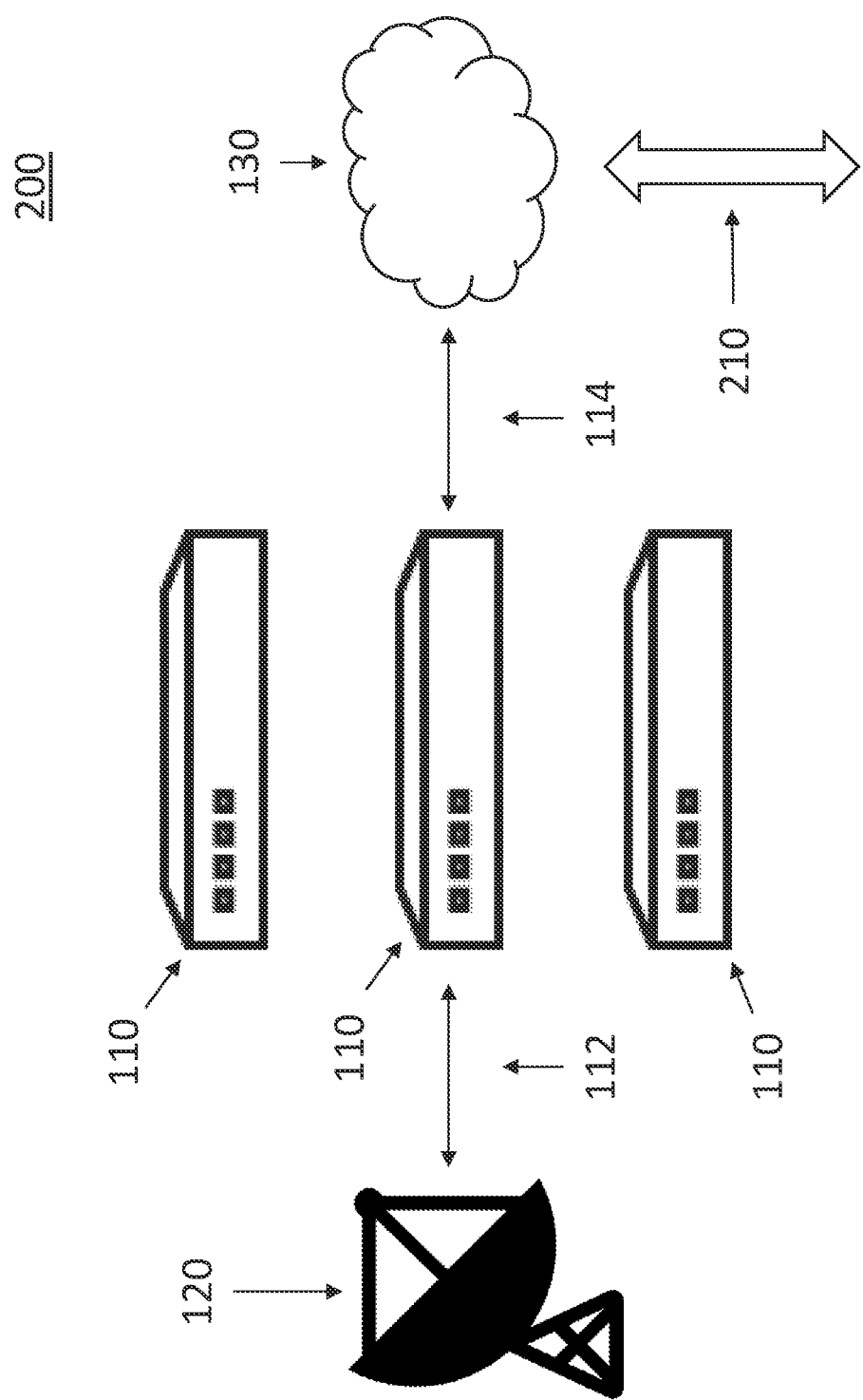
FIG. 2 is an illustration of an exemplary network environment of a plurality of hybrid set-top boxes in a region in accordance with an exemplary embodiment.
Figure 3:
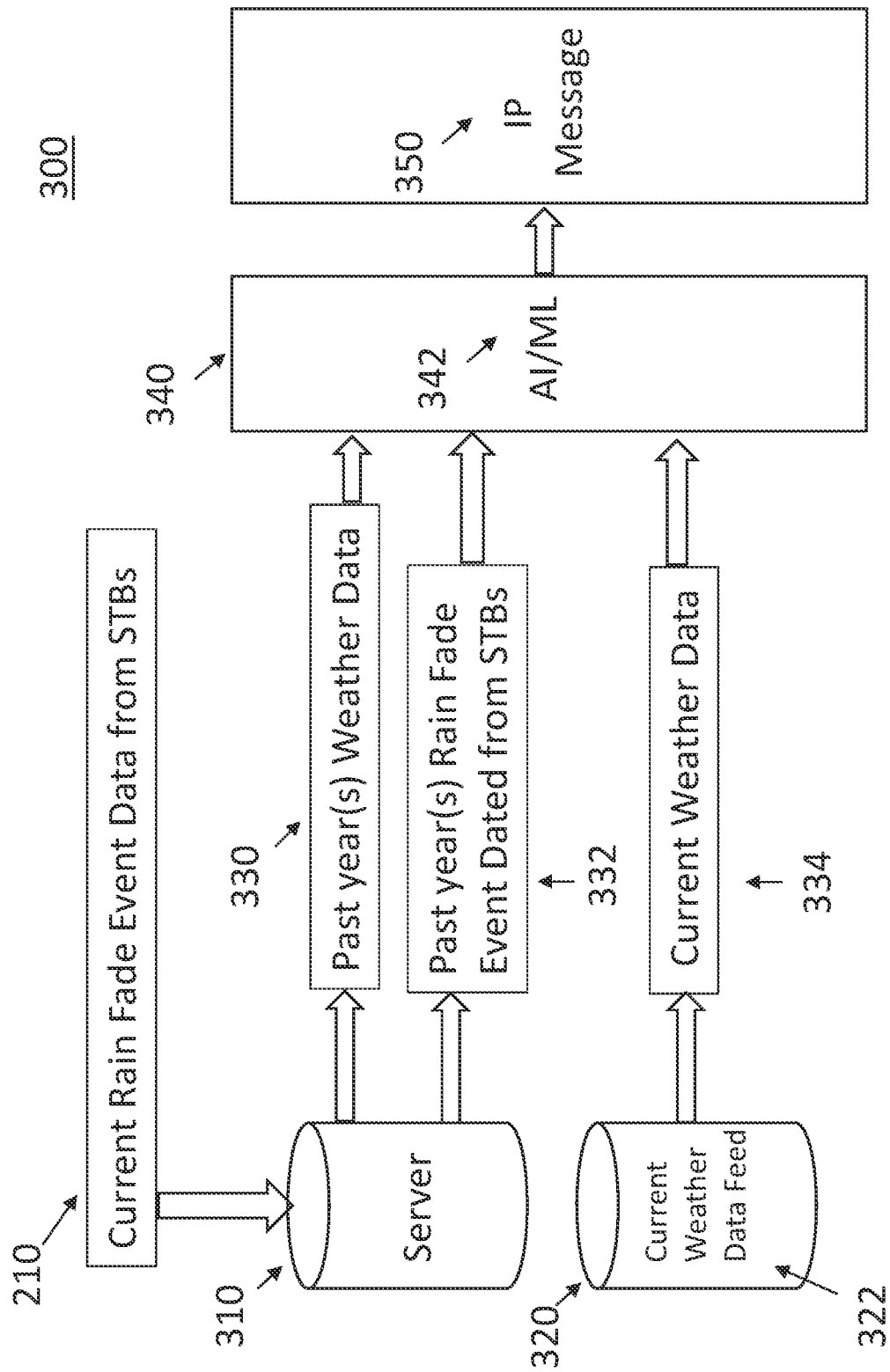
FIG. 3 is an illustration a back end network for automatic switching to an Internet Protocol (IP) connection from a satellite connection based on rain fade event patterns in accordance with an exemplary embodiment.
Figure 4:
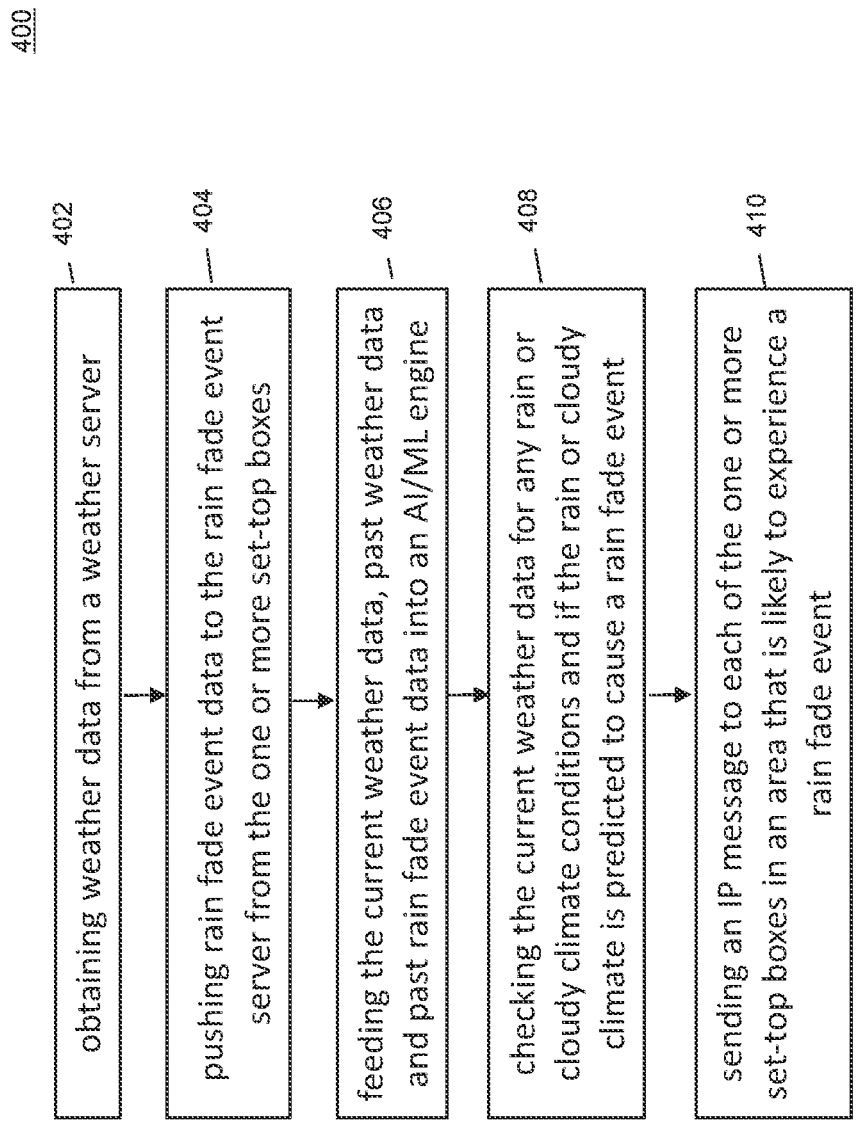
FIG. 4 is a flow chart illustrating for automatic switching to an IP connection from a satellite radio frequency (RF) using an artificial intelligence/machine learning algorithm.

FIG. 2 is an illustration of an exemplary network environment 200 of a plurality of set-top boxes 110, for example, a plurality of hybrid set-top boxes in a region in accordance with an exemplary embodiment. As shown in FIG. 2, the environment 200 can include one or more set-top boxes 110, each of the one or more set-top boxes 110 configured to receive content from a satellite dish 120. In accordance with an exemplary embodiment, the one or more set-top boxes 110 can be configured to send current rain fade event data 210 to a rain fade event server 310 (FIG. 3). The current rain fade event data 210 can be provided, for example, via the Internet 130. In accordance with an exemplary embodiment, the one or more set-top boxes 110 can be in a given area or defined region, for example, a city or town, regions or locations within a city or town, state and/or any other defined area or geographical location.

In accordance with an exemplary embodiment, each of the one or more set-top boxes 110 also includes a software application, for example, thin-client software (SW) or a rain fade monitor that continuously monitors rain fade events on the set-top box 110 and forwards the current rain fade event data 210 to the rain fade event server 310 via the IP connection 130.

FIG. 3 is an illustration a back end network 300 for automatic switching to an Internet Protocol (IP) connection from a satellite connection based on rain fade event patterns in accordance with an exemplary embodiment. As shown in FIG. 3, the back end network 300 includes the rain fade event server 310 configured to receive the current rain fade event data 210 from the one or more hybrid set-top boxes 110, and a current weather server 320 configured to receive and monitor a current weather data feed 322. The rain fade event server 310 is configured to input the current rain fade event data 210 received from the one or more set-top boxes 110 with past year(s) weather data 330 and the past year(s) rain fade event data from the one or more set-top boxes 110 into the artificial intelligence (AI) and machine learning (ML) engine 342, which can be hosted, for example, on an AI/ML server 340. In addition, the current weather data feed server 320 inputs the current weather data 334 into the artificial intelligence (AI) and machine learning (ML) engine 342. In accordance with an exemplary embodiment, the artificial intelligence (AI) and machine learning (ML) engine 342 can be configured to provide IP messaging 350 to the one or more set-top boxes 110 that switching from the satellite connection to the IP connection and/or switching back to the satellite connection from the IP connection as disclosed herein.

In accordance with an exemplary embodiment, the current weather data 334 can be obtained from a weather service, for example, from www.accuweather.com, www.weather.gov, or any local or national weather provider or server. In accordance with an exemplary embodiment, the current rain fade event data 210 from the one or more set-top boxes 110 can include data that identifies each of the set-top boxes 110. For example, the identification data associated with each of the set-top boxes can include, for example, serial numbers of the set-top box 110, identity of each communication satellite 122 in communication with the one or more set-top boxes 110, type of transponder associated with each of the set-top boxes 110, and rain fade event data associated each of the one or more set-top boxes 110 including when a rain fade event occurs, for example, start time and stop time of the rain fade event, length of each rain fade event, and other related rain fade event data.

In accordance with an exemplary embodiment, the current rain fade event data 210 from each of the one or more set-top boxes 110, the past weather data, the past rain fade events, and current weather data is input into to an artificial intelligence/machine learning (AL/ML) engine 342 (FIG. 3) which uses the data received from the rain fade event server 210 and the current weather server 320 and predicts when the one or more set-top boxes 110 in the area is likely to experience a rain fade event. The artificial intelligence/machine learning (AL/ML) engine 342 may use any suitable supervised learning (e.g., decision trees, Naïve Bayes classification, ordinary least squares regression, logistic regression, support vector machines, ensemble methods, etc.), unsupervised learning (e.g., cluster algorithms, principle component analysis, single value decomposition, independent component analysis, etc.) and reinforcement learning algorithms. See, e.g., Stuart Russell and Peter Norvig, Artificial Intelligence: A Modern Approach 3rd Edition, Person Education Limited, 2014.

In accordance with an exemplary embodiment, the AI/ML engine 342 is configured to generate a set of IP messages 350 that are sent to the one or more set-top boxes 110 in the area to switch the one or more set-top boxes 110 from a Radio Frequency (RF) signal 112 received from the communication satellite 122 and corresponding satellite dish 120 to an IP connection 114 based on a rain fade prediction before the rain fade event actually occurs. In addition, the AI/ML engine 342 can be configured to continue to monitor the current rain fade event data 210 from the one or more set-top boxes 110 and a subsequent IP message 350 can be sent to each of the one or more set-top boxes 110 to switch back to the RF connection 112 when the weather becomes conducive to receiving the RF signal 112 and relatively error free decoding can be obtained.

In addition, as disclosed herein, the system and method can also anticipate rain fade issues and the switching to IP connection 114 from a RF signal based on past year weather data 330, past year rain fade event data 332, and current weather data 334, and current rain fade events 210 from the one or more set-top boxes 110. For example, in accordance with an exemplary embodiment, as the AI/ML engine 342 learns about the rain fade events from the one or more set-top boxes 110 and weather data, the prediction becomes relatively more accurate as the data set increases such that a relatively error free viewing experience can provided to users by seamlessly switching between RF connections 112 and IP connections 114.

In accordance with an exemplary embodiment, each of the one or more set-top boxes 110 can be configured to receive video content in both Internet Protocol (IP) and digital video broadcasting (DVB) connections. For example, the IP and DVB connections are configured such that video content is available, for example, as electronic program guide (EPG) data, and the delivery of the video content can also be sent via IP packets. In accordance with an exemplary embodiment, the user can view the video content from a current location when rain fade is predicted, and once the IP connection is established, the user can be provided, for example, an option to watch the same video content from its beginning if required, or continue from the current location.

In accordance with an exemplary embodiment, a method 400 for automatic switching to an IP connection from a satellite radio frequency (RF) can predict rain fade using an artificial intelligence/machine learning (AI/ML) algorithm. In step 402, weather data 320 is obtained from a weather server. In step 404, the one or more set-top boxes 110 can push rain fade event data to the rain fade event server 310. Rain fade events have their own pattern of signal loss due to a low bit error rate (BER) value and intermittent signal loss. In accordance with an exemplary embodiment, the rain fade events can be sent to the rain fade event server 310, for example, via TR069 messages and can be done, for example, whenever a rain fade event is detected. The rain fade event data can contain, for example, a serial number of the set-top box (STB), communication satellite, transponder, date, time, and how long rain fade event lasted.

In accordance with an exemplary embodiment, the rain fade events and weather data can be stored in the rain fade event server 310 for future reference. In step 406, the current weather data, past weather data and past rain fade event data is fed into the AI/ML engine 342. For the first time the past weather data and past rain fade event data in the AI/ML engine 342 will be empty since the system is just starting to learn. In accordance with an exemplary, in step 408, the AI/ML engine 342 checks the current weather data for any rain or cloudy climate conditions and if the rain or cloudy climate is predicted to cause a rain fade event, in step 410, an IP message 350 is then sent to each of the one or more set-top boxes 110 in the area that is going to likely experience the rain fade event. For example, the IP message 350 can instruct the one or more set-top boxes 110 to immediately switch to an IP connection for viewing, which will hopefully occur before the rain fade event occurs, for example, as result of an incoming rain storm and/or a cloudy climate that is likely to cause a rain fade event. Alternatively, the IP message 350 can provide that the one or more set-top boxes 110 can occur, for example, at a set time in the future, e.g., 10 minutes, 20 minutes, 30 minutes, etc. In accordance with an exemplary embodiment, the set-top box 110 can further monitor the occurrence of the rain fade event while switched to IP connection 114 and corresponding data of the rain fade event can be sent to the headend 300, which data can be stored in the past rain fade events server 310.

In accordance with an exemplary embodiment, the AI/ML engine 342 can be configured, for example, to predict the switching to IP connection by one or more of the following categories: a determination of whether or not a rain fade event occurred at a similar time of day on one or more selected dates of a past year; a comparison of past weather data predictions against rain fade event data from the one or more set-top boxes; a comparison of past weather data predictions against actual weather data; a comparison of current weather predictions against an actual current occurrence of the rain fade event; and a comparison of current weather predictions against an actual current non-occurrence of the rain fade events. For example, the determination of whether or not a rain fade event occurred at a similar time of day on one or more selected dates of the past year can include did it rain at any time on the same date of a past year, or did it rain at any time during the same hour, or a range of hours, for example, a 4 hour window or a 6 hour window, for example, between 6:00 PM to 12:00 PM. In addition, the determination of whether or not a rain fade event occurred can be based on did it rain, for example, roughly, the same time of day, on a date in a past year that is within in plus or minus 1 day to 7 days of the current date.

In accordance with an exemplary embodiment, based on a data set of past weather data, past rain fade event data, current weather data, number of set-top box samples, satellite, transponder on which rain fade event occurred and combination and permutation of these data a percentage of rain fade occurrence is calculated, and if the calculated likelihood of rain fade event occurring is more than a predefined or preset threshold (for example, 50%) then a IP message 350 can be sent to one or more set-top boxes 110 to switch from a radio frequency (RF) signal (e.g., satellite connection) 112 to an IP connection 114 in a given area. In accordance with an exemplary embodiment, the AI/ML engine 342 can be configured to predict when a rain storm and/or cloudy climate is going to cause a rain fade event in a given location based on one or more prediction models as disclosed herein, for example, and the AI/ML engine can generate corresponding IP messages 350 to be sent to the one or more set-top boxes 110 in one or more area or location instructing the one or more set-top boxes 110 to switch to an IP connection.

In accordance with an exemplary embodiment, the AI/ML engine 342 continues learning based on the weather patterns from past data, the current weather data and rain fade events from the one or more set-top boxes 110 and can configured to predict either for each of the one or more set-top boxes 110 to use the RF connection 112 and/or to switch to an IP connection 114 for any given time of the day and/or date.

In accordance with an exemplary embodiment, the system and method can be also be configured to monitor the duration of the rain fade event based on the prediction from AI/ML engine 342 and can send IP messages 350 to the one or more set-top boxes 110 to switch back to the RF connection 112 when appropriate. For example, the AI/ML engine 342 can be configured to use the monitor rain fade events from the one or more set-top boxes in combination with the past weather from rain fade event server 310 and this information can be used to predict rain fade events and corresponding switching from the RF connection 112 to the IP connection 114 for upcoming year(s). In accordance with an exemplary embodiment, since data is continuously collected, the AI/ML engine 342 will continue to learn the likely of an occurrence of rain fade events, and such information can be used to provide the one or more set-top boxes 110 with information that a preferred connection 112, 114 can be provided at any given date and time such that a relatively interrupt free viewing experience can be experienced by the user.

Figure 5:
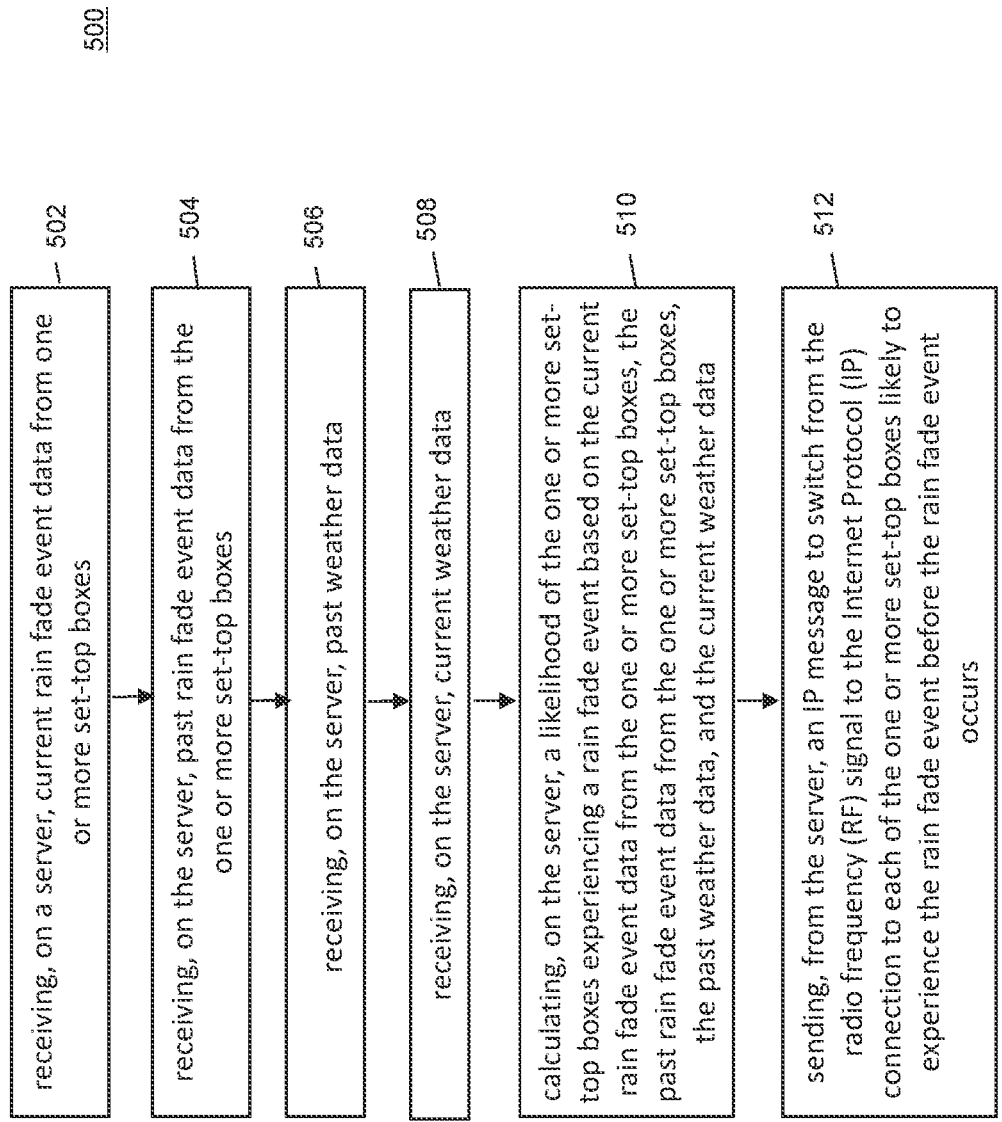
FIG. 5 is a flow chart illustrating a method for switching from a radio frequency signal to an Internet Protocol (IP) signal based on rain fade events in accordance with an exemplary embodiment.

FIG. 5 is a flow chart 500 illustrating a method for switching from a radio frequency (RF) signal to an Internet Protocol (IP) signal based on rain fade events in accordance with an exemplary embodiment. As shown in FIG. 5, in step 502, current rain fade event data 210 from one or more set-top boxes 110 is received on a server 340. In step 504, past year rain fade event data 332 from the one or more set-top boxes 110 is received on the server 340. In step 506, past weather data 330 is received on the server 340. In step 508, current weather data 334 is received on the server 340. In step 510, the server 340 calculates a likelihood of the one or more set-top boxes 110 experiencing a rain fade event based on the current rain fade event data 210 from the one or more set-top boxes 110, the past year rain fade event data 332 from the one or more set-top boxes 110, the past weather data 330, and the current weather data 334. In step 512, the server 340 sends an IP message 350 to switch from the radio frequency (RF) signal 112 to the Internet Protocol (IP) connection 114 to each of the one or more set-top boxes 110 likely to experience the rain fade event before the rain fade event occurs.

In accordance with an exemplary embodiment, the server 340 can be configured to host an artificial intelligence and machine learning (AI/ML) engine 342. The artificial intelligence and machine learning engine 342 can be configured to predict the likelihood of the one or more set-top boxes 110 experiencing the rain fade event based on the current rain fade event data 210 from the one or more set-top boxes 110, the past year rain fade event data 332 from the one or more set-top boxes 110, the past weather data 330, and the current weather data 334. For example, each of the one or more set-top boxes 110 is a hybrid set-top box, the hybrid set-top box being configured to receive content via the radio frequency (RF) signal and the Internet Protocol (IP) connection. In addition, the rain fade event can interrupt a view of the content received via the RF signal 112. For example, the rain fade event can be one or more of: a loss of the RF signal 112, an intermittent loss of the RF signal 112, and a low bit error rate (BER).

In accordance with an exemplary embodiment, the server 340 can set a threshold for the likelihood of the one or more of the set-top boxes 110 experiencing the rain fade event, and the IP message 350 is automatically sent from the server 340 to each of the one or more set-top boxes 110 that exceed the threshold to switch to the IP connection 114 from the RF signal 112. In addition, an updated Internet Protocol (IP) message can be send from the server 340 to each of the one or more set-top boxes 110 having switched to the IP connection 114 from the RF signal 112 to switch back to RF signal 112 from the IP connection 114 after the likelihood of the rain fade event occurring is below the threshold. In accordance with an exemplary embodiment, the current rain fade event data 210 from the one or more set-top boxes 110 can be sent to the server 340 via a TR069 message.

In accordance with an exemplary embodiment, the artificial intelligence and machine learning (AI/ML) engine 342 can be configured to predict the likelihood of one or more set-top boxes 110 experiencing the rain fade event based on one or more of the following: a determination of whether or not a rain fade event occurred at a similar time of day on one or more selected dates of a past year; a comparison of past weather data predictions against rain fade event data from the one or more set-top boxes; a comparison of past weather data predictions against actual weather data; a comparison of current weather predictions against an actual current occurrence of the rain fade event; and a comparison of current weather predictions against an actual current non-occurrence of the rain fade events. The current weather data, for example, can be received by the server from a weather server, the weather server configured to provide weather data for a location of each of the one or more set-top boxes. In addition, the current rain fade event data from each of the one or more set-top boxes can be continuously received by the server. For example, when the one or more set-top boxes 110 are using the IP connection 114, rain fade event data 210 can also be sent to the server 340 for training of the AI/ML engine 342.

Computer System Architecture

Figure 6:
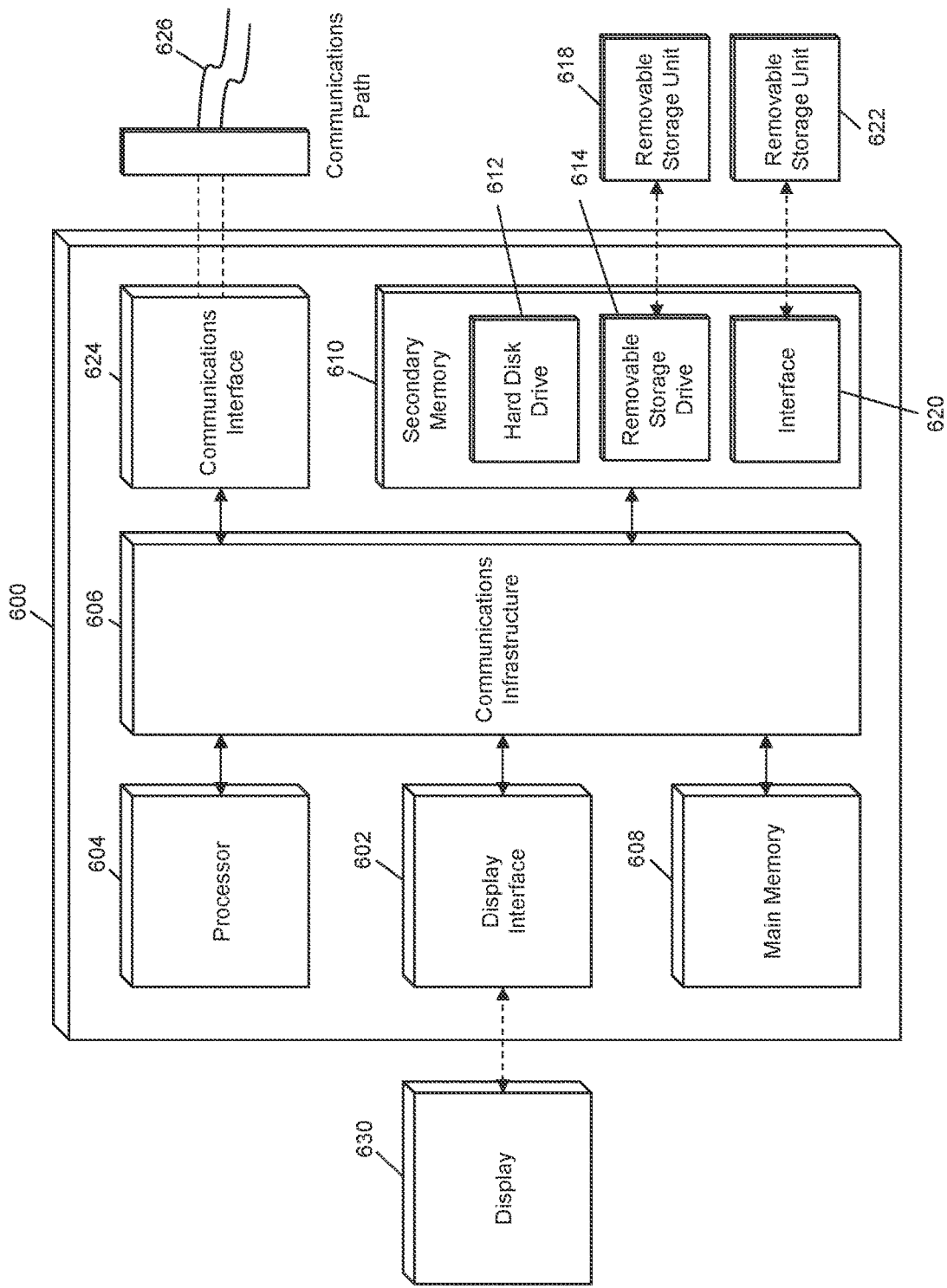
FIG. 6 is an exemplary hardware architecture for an embodiment of a communication device in accordance with an exemplary embodiment.

FIG. 6 illustrates a representative computer system 600 in which embodiments of the present disclosure, or portions thereof, may be implemented as computer-readable code executed on a processor of a computer. For example, the one or more set-top boxes 110, the one or more media display devices 140, the rain fade event server 310, the current weather data feed server 320, the AI/ML server 340 of FIGS. 1-5 may be implemented in whole or in part by a computer system 600 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the present disclosure.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this representative computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 1-5, as discussed herein. Accordingly, such computer programs may represent controllers of the computer system 600. Where the present disclosure is implemented using software executed on hardware, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software executed on hardware, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for switching from a radio frequency (RF) signal to an Internet Protocol (IP) connection based on rain fade events. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for switching from a radio frequency (RF) signal to an Internet Protocol (IP) connection based on rain fade events, the method comprising:
   receiving, on a server, current rain fade event data from one or more set-top boxes;
   receiving, on the server, past rain fade event data from the one or more set-top boxes;
   receiving, on the server, past weather data;
   receiving, on the server, current weather data;
   calculating, on the server, a likelihood of the one or more set-top boxes experiencing a rain fade event based on the current rain fade event data from the one or more set-top boxes, the past rain fade event data from the one or more set-top boxes, the past weather data, and the current weather data; and
   sending, from the server, an IP message to switch from the radio frequency (RF) signal to the Internet Protocol (IP) connection to each of the one or more set-top boxes likely to experience the rain fade event before the rain fade event occurs.

2. The method according to claim 1, further comprising:
   hosting, on the server, an artificial intelligence and machine learning engine, the artificial intelligence and machine learning engine configured to predict the likelihood of the one or more set-top boxes experiencing the rain fade event based on the current rain fade event data from the one or more set-top boxes, the past rain fade event data from the one or more set-top boxes, the past weather data, and the current weather data.

3. The method according to claim 1, wherein each of the one or more set-top boxes is a hybrid set-top box, the hybrid set-top box being configured to receive content via the radio frequency (RF) signal and the Internet Protocol (IP) connection.

4. The method according to claim 1, wherein the rain fade event interrupts a view of the content received via the RF signal, and the rain fade event comprises one or more of:
   a loss of the RF signal, an intermittent loss of the RF signal, and a low bit error rate.

5. The method according to claim 1, further comprising:
   setting, on the server, a threshold for the likelihood of the one or more set-top boxes experiencing the rain fade event; and
   automatically sending, from the server, the IP message to switch to the IP connection from the RF signal to each of the one or more set-top boxes that exceed the threshold.

6. The method according to claim 5, further comprising:
   sending, from the server, an updated Internet Protocol (IP) message to each of the one or more set-top boxes having switched to the IP connection from the RF signal to switch back to RF signal from the IP connection after the likelihood of the rain fade event occurring is below the threshold.

7. The method according to claim 1, further comprising:
   sending, to the server, the current rain fade event data from the one or more set-top boxes via a TR069 message.

8. The method according to claim 2, wherein the artificial intelligence and machine learning engine is configured to predict the likelihood of the one or more set-top boxes experiencing the rain fade event based on one or more of the following:
   a determination of whether or not a rain fade event occurred at a similar time of day on one or more selected dates of a past year;
   a comparison of past weather data predictions against rain fade event data from the one or more set-top boxes;
   a comparison of past weather data predictions against actual weather data;
   a comparison of current weather predictions against an actual current occurrence of the rain fade event; and
   a comparison of current weather predictions against an actual current non-occurrence of the rain fade events.

9. The method according to claim 1, further comprising:
   receiving, on the server, the current weather data from a weather server, the weather server configured to provide weather data for a location of each of the one or more set-top boxes.

10. The method according to claim 1, further comprising:
continuously receiving, on the server, the current rain fade event data from each of the one or more set-top boxes when the one or more set-top boxes are using either the RF signal or the IP connection.

11. A server comprising:
an operating system; and
a processor configured to:
- receive current rain fade event data from one or more set-top boxes;
- receive past rain fade event data from the one or more set-top boxes;
- receive past weather data;
- receive current weather data;
- calculate a likelihood of the one or more set-top boxes experiencing a rain fade event based on the current rain fade event data from the one or more set-top boxes, the past rain fade event data from the one or more set-top boxes, the past weather data, and the current weather data; and
- send an IP message to switch from a radio frequency (RF) signal to an Internet Protocol (IP) connection to each of the one or more set-top boxes likely to experience the rain fade event before the rain fade event occurs.

12. The server according to claim 11, wherein the server hosts an artificial intelligence and machine learning engine, the artificial intelligence and machine learning engine configured to predict the likelihood of the one or more set-top boxes experiencing the rain fade event based on the current rain fade event data from the one or more set-top boxes, the past rain fade event data from the one or more set-top boxes, the past weather data, and the current weather data.

13. The server according to claim 11, further comprising; the one or more set-top boxes, each of the one or more set-top boxes is a hybrid set-top box, the hybrid set-top box being configured to receive content via the radio frequency (RF) signal and the Internet Protocol (IP) connection; and
wherein the rain fade event interrupts a view of the content received via the RF signal, and the rain fade event comprises one or more of:
a loss of the RF signal, an intermittent loss of the RF signal, and a low bit error rate.

14. The server according to claim 11, wherein the processor is further configured to:
set a threshold for the likelihood of the one or more of the set-top boxes experiencing the rain fade event; and
automatically send the IP message to switch to the IP connection from the RF signal for each of the one or more set-top boxes that exceed the threshold.

15. The server according to claim 14, wherein the processor is further configured to:
send an updated Internet Protocol (IP) message to each of the one or more set-top boxes having switched to the IP connection from the RF signal to switch back to RF signal from the IP connection after the likelihood of the rain fade event occurring is below the threshold.

16. A non-transitory computer readable medium having instructions operable to cause one or more processors to perform operations for switching from a radio frequency (RF) signal to an Internet Protocol (IP) connection based on rain fade events comprising:
- receiving, on a server, current rain fade event data from one or more set-top boxes;
- receiving, on the server, past rain fade event data from the one or more set-top boxes;
- receiving, on the server, past weather data;
- receiving, on the server, current weather data;
- calculating, on the server, a likelihood of the one or more set-top boxes experiencing a rain fade event based on the current rain fade event data from the one or more set-top boxes, the past rain fade event data from the one or more set-top boxes, the past weather data, and the current weather data; and
- sending, from the server, an IP message to switch from the radio frequency (RF) signal to the Internet Protocol (IP) connection to each of the one or more set-top boxes likely to experience the rain fade event before the rain fade event occurs.

17. The non-transitory computer readable medium according to claim 16, further comprising:
hosting, on the server, an artificial intelligence and machine learning engine, the artificial intelligence and machine learning engine configured to predict the likelihood of the one or more set-top boxes experiencing the rain fade event based on the current rain fade event data from the one or more set-top boxes, the past rain fade event data from the one or more set-top boxes, the past weather data, and the current weather data.

18. The non-transitory computer readable medium according to claim 16, wherein each of the one or more set-top boxes is a hybrid set-top box, the hybrid set-top box being configured to receive content via the radio frequency (RF) signal and the Internet Protocol (IP) connection.

19. The non-transitory computer readable medium according to claim 16, wherein the rain fade event interrupts a view of the content received via the RF signal, and the rain fade event comprises one or more of:
a loss of the RF signal, an intermittent loss of the RF signal, and a low bit error rate.

20. The non-transitory computer readable medium according to claim 16, further comprising:
setting, on the server, a threshold for the likelihood of the one or more of the set-top boxes experiencing the rain fade event;
automatically sending, from the server, the IP message to switch to the IP connection from the RF signal for each of the one or more set-top boxes that exceed the threshold; and
sending, from the server, an updated Internet Protocol (IP) message to each of the one or more set-top boxes having switched to the IP connection from the RF signal to switch back to RF signal from the IP connection after the likelihood of the rain fade event occurring is below the threshold.

* * * * *